United States Patent [19]

Stueber et al.

[11] 4,070,507

[45] Jan. 24, 1978

[54] PLATINUM-RHODIUM-CONTAINING HIGH TEMPERATURE ALLOY COATING METHOD

[75] Inventors: Richard J. Stueber, Suffern, N.Y.; Stanley J. Klach, Riverdale, N.J.

[73] Assignee: Chromalloy American Corporation, New York, N.Y.

[21] Appl. No.: 709,770

[22] Filed: July 29, 1976

Related U.S. Application Data

[62] Division of Ser. No. 551,615, Feb. 21, 1975, Pat. No. 3,999,956.

[51] Int. Cl.$^2$ .................. C23C 9/02; C23C 11/02
[52] U.S. Cl. .................. 427/252; 427/253; 427/328; 427/383 D; 427/405
[58] Field of Search .......... 427/253, 252, 328, 383 D, 427/405; 29/194, 197

[56] References Cited

U.S. PATENT DOCUMENTS

| | | | |
|---|---|---|---|
| 3,257,230 | 6/1966 | Wochtell et al. | 29/194 X |
| 3,494,748 | 2/1970 | Todd | 29/194 |
| 3,677,789 | 7/1972 | Bungardt et al. | 29/197 X |
| 3,692,554 | 9/1972 | Bungardt et al. | 29/197 X |
| 3,819,338 | 6/1974 | Bungardt et al. | 29/194 |
| 3,957,454 | 5/1976 | Bessen | 29/194 |
| 3,961,910 | 6/1976 | Baladjanian et al. | 427/253 X |
| 3,976,436 | 8/1976 | Chang | 29/194 X |
| 3,978,251 | 8/1976 | Stetson et al. | 29/197 X |

*Primary Examiner*—Harry J. Gwinnell
*Attorney, Agent, or Firm*—Hopgood, Calimafde, Kalil, Blaustein and Lieberman

[57] ABSTRACT

Aluminized nickel-base, cobalt-base and nickel-cobalt-base heat resistant alloy substrates are provided in which, prior to aluminizing the substrate, the substrate is provided with a thin coating of rhodium and thereafter a thin coating of platinum, the coatings being diffusion bonded to the substrate, such that when the prepared substrate is aluminized by pack cementation, a compositely structured coating is obtained characterized by improved resistance to high temperature oxidation and sulfidation.

5 Claims, 11 Drawing Figures

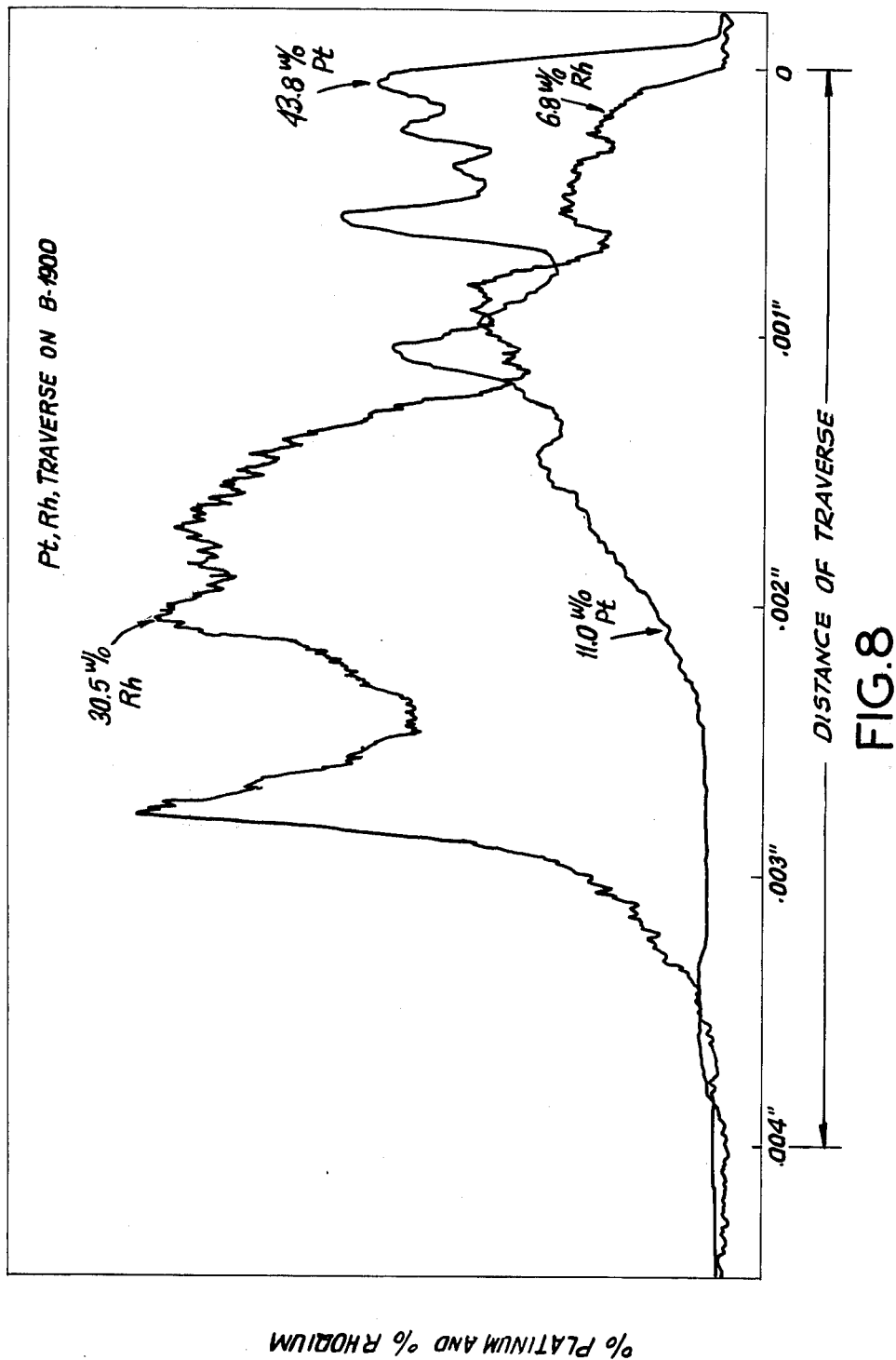

PLATINUM-RHODIUM-CONTAINING HIGH TEMPERATURE ALLOY COATING METHOD

This is a Division of application Ser. No. 551,615 filed Feb. 21, 1975, now U.S. Pat. No. 3,999,956.

This invention relates to the pack-aluminizing of heat resistant superalloy substrates and, in particular, to a method of producing a heat and corrosion resistant metal coating on nickel-base, cobalt-base and nickel-cobalt-base superalloys, wherein the aluminized coating is markedly improved in its heat and corrosion resistant properties at elevated temperatures by virtue of the presence of diffused zones of platinum and rhodium in said coating.

State of the Art

Metallurgical developments in recent years have indicated the necessity of using high nickel, high cobalt and high nickel-cobalt-base heat resistant alloys, e.g. superalloy shaving desirable physical properties for various high temperature applications. Examples of such applications are rotor blades and stator vanes for high temperature gas turbines where operation without failure is desired of the part, such as during prolonged exposure to temperatures well above 1,500° F (815° C) and even substantially above the temperature range at which failure or diminution of the strength characteristics may be expected of even high temperature austenitic or nickel chromium steel.

The use of superalloys by themselves with nothing more has not always provided the necessary resistance to hot corrosion damage at such elevated temperatures, although present day superalloys are markedly improved over prior alloys. Thus, corrosion resistant coatings have been resorted to as one means of further augmenting the resistance of the substrate to high temperature corrosion, particularly on complex shaped components used in contemporary jet engines where handling and gauging damage have been known to cause premature failure of protective coatings which tend to be brittle in nature.

A wide variety of different processes and techniques are known for producing a diffusion coating or layer into or on the surface of metal articles. Some of these well-known techniques (and those generally of the character to which this invention particularly relates) involved embedding the article to be coated (or otherwise covering the surface thereof) in a powdered coating pack including a powdered source of the coating material (with or without admixture with powdered inert filler such as alumina) and a vaporizable halogen carrier ingredient (such as a heat-volatile halide), and heating the thus embedded article and pack in a sealed retort (or other controlled and generally non-oxidizing atmosphere) to an elevated temperature at which the carrier material vaporizes and/or otherwise reacts with or functions as a carrier for transporting the coating material from or through the powdered pack to the surface of the article to be coated for diffusion therein.

Generally speaking, the various chemical reactions involved (e.g. between the carrier and the coating material and the metal or other components of the article to be coated, among whatever ingredients are in the pack, between coating material and whatever intermetallics or alloys may have already been formed at or in the surface of the article being coated, etc.) occur more or less simultaneously during the heating treatment and are mostly of a reversible nature, so that the net result of the coating step and the chemical reactions therein involved may depend predominantly upon the various equilibria achieved. It will be understood that, under certain temperature conditions and with certain reactive carrier materials, ingredients in the coating pack may be inclined to combine with each other at the same time (and, perhaps even at the same rate) as one or another thereof may diffuse into the surface of the metal article; while (if the equilibrium conditions are appropriate) some portion of the metal from the article itself, or one of another component thereof, may also "diffuse" out of the article and into the pack ingredients.

In U.S. Pat. No. 3,257,230, it is stated that aluminum diffusion into the surface of a predominantly nickel-containing article may be productive of a variety of different nickel aluminides, with the particular one formed being perhaps a function of the proportion of aluminum carried to the article surface or diffused therein at the particular operating temperature. If the particular aluminide desired is one containing less than the maximum amount of aluminum, formation thereof may not occur if aluminum from the pack be too rapidly presented to or available in the article surface. If the treatment is maintained at a sufficiently high temperature and prolonged to achieve a desired thickness of coating layer, too rapid transfer of aluminum from the pack to the surface of the article (or too slow diffusion from the surface on inwardly of the article) may occur to form a lower melting high-aluminide rather than the one desired.

It was discovered that the foregoing could be avoided by including a portion of a buffering material, such as chromium, in the aluminizing pack to form with the aluminum therein a preliminary intermetallic, the diffusion of which into the surface of the article can only occur at a diminished rate (or, perhaps, cannot occur at all) at the desired treating temperatures. Thus, the availability or transfer of the aluminium component in the pack for diffusion into the surface of the article is readily inhibited or controlled or metered so that the temperature levels or other thermodynamic conditions necessary to break down the preliminary aluminide sufficiently for aluminum to be diffused will produce the desired conditions for the formation of the particular nickel aluminide desired in the surface of the article.

Utilizing an inhibiting or rate controlling component such as chromium in an aluminum pack for preliminary formation therein of a chromium aluminide has been found to produce satisfactory results in that temperatures high enough to break down the chromium aluminide for diffusion coating of aluminum are at levels where the desired particlar nickel aluminide forms in the surface of a nickel-containing alloy.

It has been found, according to the aforementioned patent, that in the broad sense, aluminum coatings are obtainable from a chromium-containing pack containing 3 to 20% by weight of aluminum, the pack preferably also containing an inert diluent, such as powdered refractory oxides, e.g. alumina, magnesia, calcia, silica, zirconia and the like. It was noted that the ratio of chromium to aluminum in the pack may range up to 8 and, more preferably, from about 0.5 to 4.6 (e.g. 2 to 4). A composition found particularly satisfactory for commercial use is one containing by weight 6% alumina as the inert diluent, 22%, chromium, 8% aluminum and 1% ammonium fluoride, with the coating layer or casing depths of the order of about 0.0019 inch to 0.0022 inch. In producing the coating, the pack is enclosed in a sealed container and heated at between 1800° to 2100° F (980° to 1150° C) for 4 to 20 hours, with the temperature and time ranging more broadly from 1400° to 2200° F (760° to 1205° C) for ¼ to 40 hours. Severe oxidation testing at 2000° F (1093° C) in an oxidizing atmosphere provided in a standard testing furnace indicated no failure of any of the coated parts in over 85 hours of testing treatment.

While markedly improved resistance to oxidation at elevated operating temperatures was obtainable due to the nickel aluminide formed in the coating by the foregoing process, recent increases in power requirements of improved jet engines have called for alloy materials having further improved high temperature corrosion and oxidation resistant properties.

U.S. Pat. No. 3,819,338 issued June 25, 1974 is directed to the production of heat resistant coatings on nickel and cobalt-base heat resistant alloy in which the coating includes a platinum group metal along with aluminum. A platinum group metal is diffused at the same time as aluminum or, alternatively, the platinum group may first be applied to the surface of the part in the form of a coating at least 7 microns thick and then followed by diffusion heat treatment with aluminum from a pack. The diffusion heat treatment with aluminum may be carried out at a temperature ranging from about 900° to 1200° C for about 2 hours to 10 hours. Platinum was employed as a first coat on an alloy containing by weight 0.12% C, less than 0.25% Si, less than 0.25% Mn, 13.5% Cr, 4.5% Mo, 6.25% Al, 2.3% Nb/Ta, less than 1% Co, 0.9% Ti, less than 1.5% Fe, traces of B and Zr and the remainder nickel. The surface of the alloy was cleaned, electroplated with platinum (7 microns), heat treated at a low temperature to remove hydrogen and then diffusion heat treated with aluminum in a pack containing 5% Al and 95% $Al_2O_3$ for 2½ hours at 1100° C under a protective atmosphere of hydrogen. The platinum-aluminum coatings produced in accordance with the patent are said to exhibit improved resistance to scaling for prolonged periods of time as compared to a coating produced from aluminum alone.

Tests have indicated that, while the use of platinum together with aluminum appeared to improve the resistance to scaling, coated alloy coupons tended to be characterized by short term failure while in test. In some instances, the test specimens would typically fail less than 10% of their anticipated lifetimes. Apparently these failures appeared to be associated with poor adhesion between the coating and the base metal due to localized swelling of the coating. Moreover, platinum tended to diffuse into the substrate at elevated temperatures and thus its efficacy diminished.

We have found that the foregoing problem can be overcome by subjecting the platinumized surface to high temperature annealing prior to aluminizing and further by employing a composite platinum group metal coating in which rhodium is first applied to the alloy substrate and then platinum before the alloy is aluminized, provided the precoated alloy is high temperature annealed first before it is aluminized. We have also found that markedly improved results are obtained as compared to using platinum alone.

Objects of the Invention

It is thus an object of this invention to provide a pack-aluminizing process for producing corrosion and scale resistant nickel and/or cobalt aluminide coatings.

Another object is to provide a pack aluminizing process for producing a nickel and/or cobalt aluminide coating of uniform thickness characterized by improved life when subjected to corrosion atmospheres at elevated temperatures.

Still another object is to provide as an article of manufacture a coated nickel and/or cobalt-base heat resistant article characterized by a composite alloy coating exhibiting markedly improved heat and corrosion resistant properties.

These and other objects will more clearly appear from the following disclosure, the appended claims and the accompanying drawing, wherein:

FIG. 8 is an electron microprobe trace of the cross section of an aluminized coating (Alloy B1900) in which the Rh/Pt thickness ratio applied to the alloy substrate prior to aluminizing was about 3:2;

Figure 10:
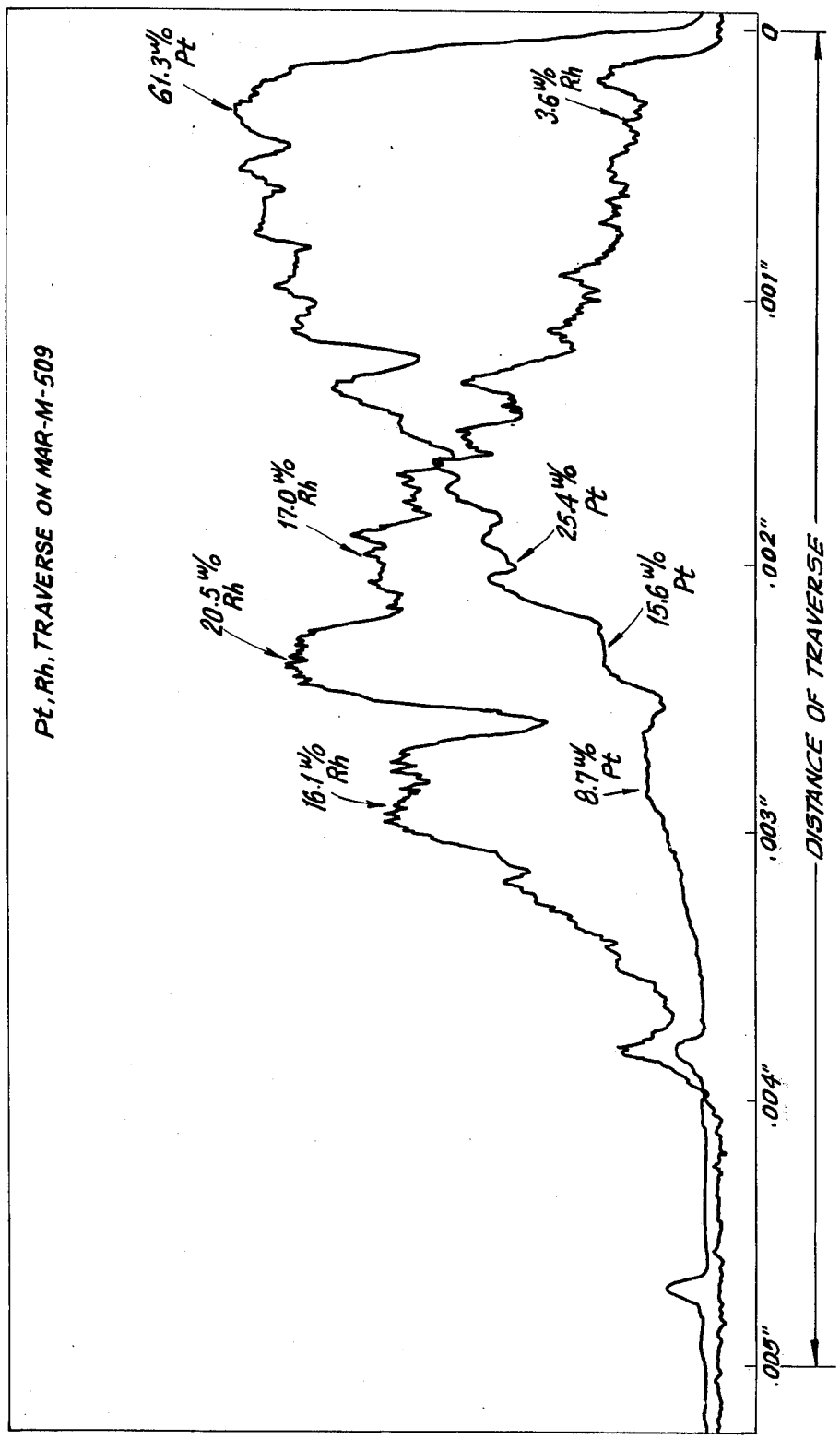
Figure 11:
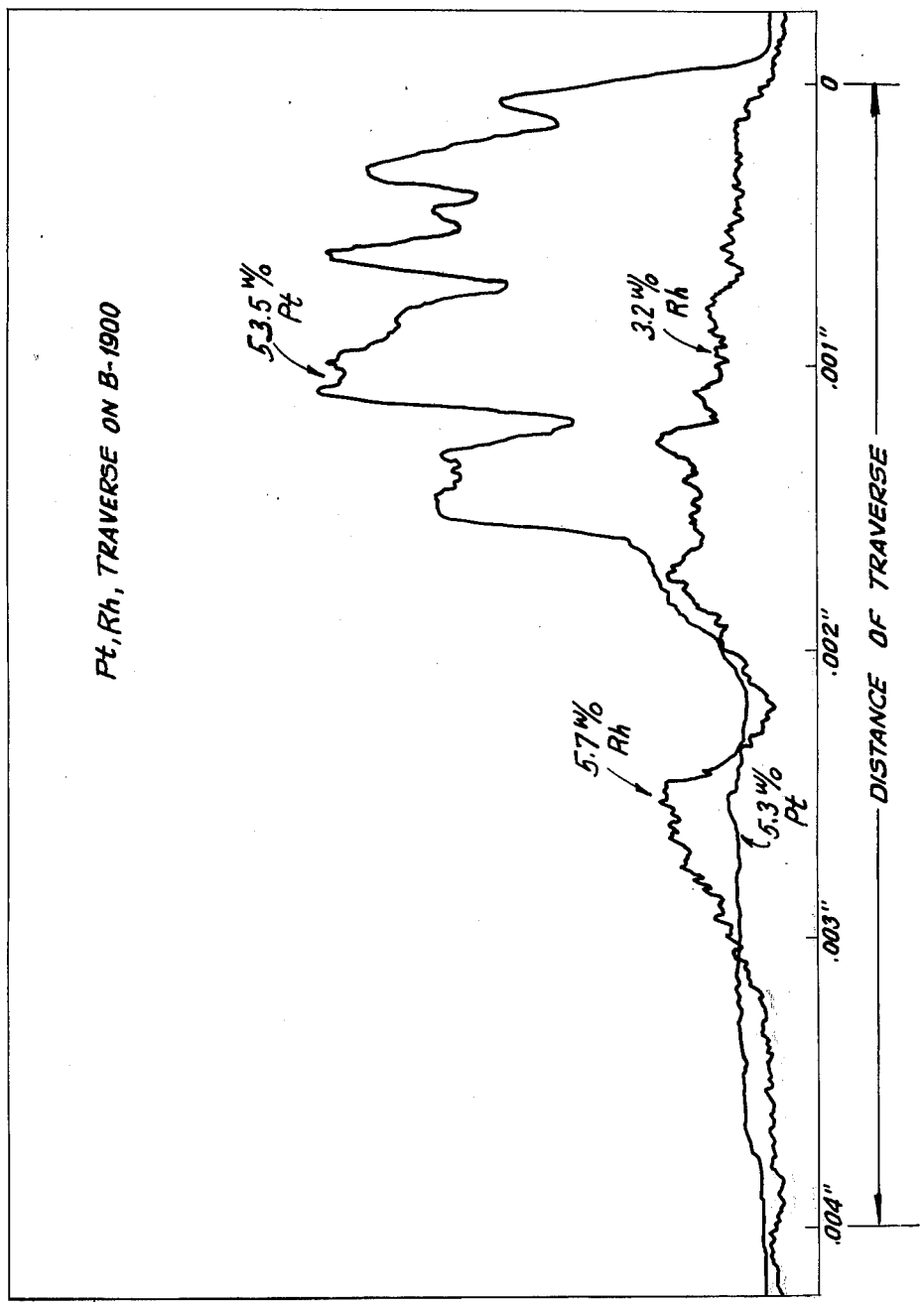

FIG. 10 is an electron microprobe trace of the cross section of an aluminized coating (Alloy MAR-M-509) in which the Rh/Pt thickness ratio applied to the alloy substrate prior to aluminizing is about 1:1; and FIG. 11 is an electron microprobe trace of the cross section of an aluminized coating (Alloy B1900) in which the Rh/Pt thickness ratio applied to the alloy substrate prior to aluminizing is about 1:3.

Statement of the Invention

Stating it broadly, one embodiment of the invention resides in a method for improving the heat and corrosion resistance of a nickel-base, cobalt-base and nickel-cobalt-base heat resistant alloy article which comprises, providing said article with a clean surface for receiving a metal coating, thermally diffusing first and second coatings of rhodium and platinum in the form of diffused layers into the surface of said article, and then pack aluminizing said article at an elevated aluminizing temperature by embedding it in a cementation pack containing chromium metal and sufficient aluminum to effect the diffusion thereof into the surface of said article, said pack also containing a vaporizable halogen material as a carrier for said aluminum, thereby producing a multilayered protective coating characterized metallographically by an outer zone containing platinum and an inner zone substantially adjacent the surface of the article containing rhodium with an intermediate zone containing an aluminide compound selected at least from the group consisting of nickel aluminide, cobalt aluminide and mixtures thereof.

As another embodiment, the invention also provides an aluminized heat resistant article of manufacture formed of a heat resistant alloy selected from the group consisting of nickel-base, cobalt-base and nickel-cobalt-base alloy, said aluminized article being characterized by a multi-layered coating having a metallographic structure defining an outer zone adjacent the coating surface thereof containing platinum, an inner zone substantially adjacent the article substrate containing rhodium and a zone intermediate said inner and outer zones containing an aluminide compound selected at least from the group consisting of nickel aluminide, cobalt aluminide and mixtures thereof.

The coating produced by the invention has a uniform thickness and provides improved sulfidation and oxidation resistance at elevated temperatures. The coatings produced in accordance with the invention are sufficiently ductile to inhibit cracking and spalling due to thermal stresses.

A wide range of nickel-base and/or cobalt-base alloys can be coated using the foregoing method. A typical alloy composition range is one containing by weight of up to 30% Cr, e.g. 5 to 30% Cr, up to 20% of a metal from the group consisting of Mo and W, up to 10% of a metal from the group consisting of Cb and Ta, up to 1% C (preferably up to 0.5%), up to 10% by weight of a metal from the group consisting of Ti and Al, the total amount of Ti and Al not exceeding 12%, up to 20% Fe, up to 2% Mn, up to 2% Si, up to 0.2% B, up to 1% Zr, up to 2% Hf, and the balance at least 45% by weight of at least one metal selected from the group consisting of nickel and cobalt.

The expression "balance at least 45% by weight of at least one of the metals nickel and cobalt" means that when the two metals are present, the sum is at least 45% of the total composition. Thus, nickel may be present alone, or cobalt may be present alone, each in the amount of at least 45%. When both are present, either may be present over any range in making up the balance so long as the sum of the two is at least about 45% by weight.

Examples of known alloys falling within the aforementioned range are nickel-base alloys referred to by designations Mar-M-246, IN-738, IN-792, Udimet 500, Mar-M-432, IN-713, Mar-M-200, B-1900, TRW-6A, IN-600 and Udimet 700, and cobalt-base alloys, such as WI-52 and Mar-M-509. Compositions of the foregoing illustrative alloys are given in Table 1 as follows:

TABLE 1

| Alloy Designation | Chemical Composition, Weight Percent | | | | | | | | | | | | |
|---|---|---|---|---|---|---|---|---|---|---|---|---|---|
| | C | Cr | Ni | Co | Mo | W | Cb | Fe | Ti | Al | B | Zr | Others |
| IN-738 | 0.13 | 15.9 | Bal. | 8.5 | 1.8 | 2.6 | 0.9 | 0.1 | 3.5 | 3.4 | 0.011 | 0.11 | 1.9 Ta |
| IN-792 | 0.21 | 12.7 | Bal. | 9.0 | 2.0 | 3.9 | — | — | 4.2 | 3.2 | 0.02 | 0.1 | 3.9 Ta |
| NI-713C | 0.12 | 12.5 | Bal. | — | 4.2 | — | 2.0 | — | 0.8 | 6.1 | 0.01 | 0.10 | — |
| IN-600 | 0.04 | 15.8 | Bal. | — | — | — | — | 7.2 | — | — | — | — | 0.2 Mn, 0.2 Si |
| Udiment 500 | 0.08 | 18.0 | Bal. | 18.5 | 4.0 | — | — | — | 2.9 | 2.9 | 0.006 | 0.05 | — |
| Udiment 700 | 0.08 | 15.0 | Bal. | 18.5 | 5.2 | — | — | — | 3.5 | 4.3 | 0.03 | — | — |
| Mar-M-200 | 0.15 | 9.0 | Bal. | 10.0 | — | 12.5 | 1.0 | — | 2.0 | 5.0 | 0.015 | 0.05 | — |
| Mar-M-246 | 0.15 | 9.0 | Bal. | 10.0 | 2.5 | 10.0 | — | — | 1.5 | 5.5 | 0.015 | 0.05 | 1.5 Ta |
| Mar-M-432 | 0.15 | 15.4 | Bal. | 19.7 | — | 3.0 | 1.8 | — | 4.4 | 2.9 | 0.013 | 0.03 | 2.2 Ta |
| B-1900 | 0.10 | 8.0 | Bal. | 10.0 | 6.0 | — | — | — | 1.0 | 6.0 | 0.015 | 0.10 | 4.0 Ta |
| TRW-6A | 0.13 | 6.1 | Bal. | 7.5 | 2.0 | 5.8 | 0.5 | — | 1.0 | 5.4 | 0.02 | 0.13 | 9.0 Ta, 0.4 Hf, 0.14 Re |
| WI-52 | 0.45 | 21.0 | — | Bal. | — | 11.0 | 11.0 | 2.0 | 2.0 | — | — | — | 0.25 Mn, 0.25 Si |
| Mar-M-509 | 0.6 | 21.0 | 10.0 | Bal. | — | 7.0 | — | 1.5 | 0.2 | — | 0.01 | 0.5 | 3.5 Ta, 0.1 Mn, 0.1 Si |

In carrying out the pack cementation process following application of the rhodium and platinum coatings, a set of double nested retorts may be used in which the inner and outer retorts are glass sealed to inhibit the entry of air during the coating process. However, single retorts may be used as well. The chromium-aluminum pack is freshly prepared and then prereacted by heating the pack to a temperature of, for example, about 980° to 1205° C (1800° to 2200° F) for 1 to 20 hours, the prereacted powder being then screened and used as the pack into which the article to be aluminized is then embedded. The pack composition may range by weight from 5 to 40% chromium, or 10 to 30% chromium, with the aluminum ranging from about one-eighth to 20% and, more preferably, from about one-eighth to about 5% aluminum, a small but effective amount of a halogen material energizer (e.g. from about one-eighth to 1 or 2%) and the balance a diluent material, e.g. such refractory oxides as alumina, zirconia, calcia, silica and the like.

Details of the Invention

A novel feature of the invention resides in the type of coating produced which has a composite structure (i.e. multilayered structure) in which the zone contains platinum and the inner zone adjacent the substrate contains rhodium, said outer and inner zones having sandwiched therebetween a relatively high concentration of an aluminide phase selected at least from the group consisting of nickel and/or cobalt aluminide.

We have found that by first coating the alloy substrate with rhodium and then with platinum and the coated alloy substrate diffusion annealed at an elevated temperature prior to pack aluminizing, a composite structure is obtained after aluminizing which exhibits markedly improved heat and corrosion resistant properties. The rhodium and platinum coating may be diffusion annealed simultaneously or the rhodium coating may be annealed first, the platinum coating applied and the platinum coating then diffusion annealed.

The ratio of thickness of rhodium to platinum when applied to the clean substrate may range from about 0.2:1 to about 3.5:1, the ratio on the weight basis (the density for rhodium being 12.1 and for platinum being 21.6) ranging from about 0.1:1 to 1.95:1. We have found the preferred thickness ratio of Rh/Pt to be about 0.5:1 to 2.5:1 (or 0.28:1 to 1.4:1 on the weight basis). The foregoing thickness ratios apply for coating thickness for each of rhodium and platinum ranging from about 0.00005 to 0.002 inch.

It has been found that by using the coating technique of the invention, an increase in life of upwards of about 50% is obtainable for a particular alloy composition as compared to using platinum alone. Indications are that the improvement appears to be based on the relative diffusivities of nickel and aluminum in platinum and rhodium. For example, it appears that nickel diffuses more readily through rhodium than through platinum; whereas, the reverse appears to be true for aluminum.

Where platinum is employed as the coating additive in the production of aluminized nickel-base alloys, platinum aluminide is obtained in the form of an outer layer at at least one of the aluminides $PtAl_2$ and $PtAl_3$ distributed through a nickel aluminide matrix (e.g. NiAl) with an intermediate layer of nickel aluminide becoming progressively richer in nickel and leaner in aluminum in the direction of the nickel alloy substrate.

Failure of a platinum aluminide coating in service is usually characterized by a localized penetration of the platinum aluminide outer layer by the hot reactive atmosphere (oxidation and sulfidation attack). After penetration, the nickel aluminide intermediate layer (e.g. NiAl) begins to fail rapidly. After a prolonged period of high temperature testing, e.g. 300 hours or more, the diffusion zone between the coating and substrate tends to disappear. This can adversely affect the life of the coating.

The invention provides increased resistance to oxidation and sulfidation attack by utilizing the differences in diffusities of nickel and aluminum in both platinum and rhodium. Thus, in one specific embodiment, a nickel alloy part to be coated was cleaned and plated with approximately 0.0002 inch (0.2 mil ) of rhodium followed by 0.0003 inch (0.3 mil) plating of platinum. The composite layer was then diffusion heat treated at 1038° C (1900° F) for two hours and then aluminized by pack cementation in which the coated part is embedded in a powder alumina ($Al_2O_3$) pack containing about 20% chromium, 2.5% aluminum, 0.25% ammonium bifluoride, the alumina making up substantially the balance. The powder mixture is placed in a retort which is sealed as described hereinbefore and the pack with the embedded part heated at 1038° C (1900° F) for about 15 hours to produce a compositely structured coating characterized by containing platinum at the outer zone and rhodium at the inner zone adjacent the substrate with a nickel aluminide-containing zone sandwiched in between.

Tests have shown that the Rh/Pt structure aluminized coating is superior to platinum alone. A preferred structure which has given good results is one in which the outer zone is rich in platinum and the inner zone rich in rhodium, the intermediate zone sandwiched in between being relatively high in nickel aluminide concentration. This preferred structure can be obtained by controlling the thickness ratio of rhodium to platinum applied to the alloy substrate prior to aluminizing the part. This will be clearly apparent from the following example.

EXAMPLE

The evaluation of the novel coatings provided by the invention was based on high temperature sulfidation and oxidation tests, metallographic examination and electron microprobe data.

Two nickel base alloys were tested (B1900 and IN738) and a cobalt-base alloy (Mar-M-509). The composition of these alloys in recited in Table 1 set forth hereinbefore.

The substrates were prepared for pack aluminizing as follows.

The substrates were first grit blasted using 46 mesh aluminum oxide grit, then electrocleaned using a trisodium phosphate cleaning solution in order to assure adhesion of the plated metal.

Rhodium was then plated onto the substrate in various thicknesses ranging from 0.00005 to 0.0003 inches by electroplating from the following bath at a current density of about 20 amps/ft$^2$: an aqueous sulfuric acid solution containing 1 wt% sulfuric acid and containing 3 grs/liter rhodium.

Following rhodium plating, the substrates were then plated with various thicknesses of platinum over the range of from 0.00005 to 0.0003 inch by electroplating from the following bath at a current density of about 20 amps/ft$^2$: an aqueous solution containing 4 grs/liter platinum, 30 grs/liter ammonium phosphate (dibasic) and 100 grs/liter of sodium phosphate (dibasic) to provide Rh/Pt thickness ratios ranging from about 0.2:1 to about 3:1.

Other methods may be employed for applying rhodium and platinum. For example, the platinum group metals may be applied as a powder slurry by dispersing the metal powder in an organic binder, for example, for suspending 10 to 30% by weight minus 100 mesh metal powder in a liquid organic binder comprising either acrylic or nitrocellulose lacquer. Once the part is dipped into the slurry, it is allowed to dry at room temperature and then diffusion heat treated.

Following application of the duplex layers of Rh/Pt, the coated alloy substrate is subjected to a diffusion heat treatment at a temperature in the range of about 1010° C to 1150° C (1850° F to 2100° F) for about 2 to 5 hours. A preferred temperature is 1038° C (1900° F) for about 2 hours. Alternatively, the substrate may be diffusion heat treated after each plating operation at the temperatures given above.

The thus-prepared substrates are then each embedded in a powder pack containing 20% chromium, 2.5% aluminum, about 0.25% ammonium bifluoride and the balance alumina in a retort as described hereinbefore and the assembly heated at 1038° C (1900° F) for 25 hours at temperature. Broadly, the temperature may range from about 760° to 1205° C (1400° to 2200° F) for ¼ to 40 hours and, more preferably, from about 955° to 1120° C (1750° to 2050° F) for about 10 to 30 hours.

After aluminizing the Rh/Pt plated alloy parts, it is preferred to subject the alloy parts to a solution heat treatment at a temperature up to about 1150° C (2100° F), the temperature generally ranging from about 1080° to 1125° C (1975° to 2050° F). Following the solution heat treatment, the alloy may be subject to precipitation hardening, depending upon the particular alloy composition being coated, the precipitation hardening treatment being employed to optimize the stress rupture properties of the alloys, such as B1900 and IN 738.

Some of the aluminized specimens were produced with rhodium alone and some with platinum alone.

It was observed that the aluminide coatings produced with both the Rh/Pt coating retained a smoother surface after high temperature cyclic testing over the range of 400° C to 1105° C as compared to the aluminide coatings with platinum alone.

The results obtained on alloys B1900 and Mar-M-509 are given in the following tables:

Table 2
ALLOY B 1900

| Specimen No. | Rh Thickness 0.0001 inch | Pt Thickness 0.0001 inch | Ratio Rh/Pt | Aluminized Case Depth 0.001 inch | Hot Corrosion Life, Hours |
|---|---|---|---|---|---|
| 1 | 0.5 | 2.5 | 1/5 | 3.5 | 234 |
| 2 | 1.5 | 1.5 | 1/1 | 3.0 | 432* |
| 3 | 2.5 | 0.8 | 3/1 | 3.5 | 325 |
| 4 | 3.0 | — | — | 3.0 | 258 |
| 5 | — | 3.0 | — | 3.5 | 216 |

*This specimen has not failed after 432 hours.

Table 3
ALLOY MAR-M-509

| Specimen No. | Rh Thickness 0.0001 inch | Pt Thickness 0.0001 inch | Ratio Rh/Pt | Aluminized Case Depth 0.001 inch | Hot Corrosion Life, Hours |
|---|---|---|---|---|---|
| 6 | 0.5 | 2.5 | 1/5 | 3.2 | 264 |
| 7 | 1.5 | 1.5 | 1/1 | 3.4 | 294 |
| 8 | 2.5 | 0.8 | 3/1 | 3.4 | 216 |
| 9 | 3.0 | — | — | 3.1 | 232 |
| 10 | — | 3.0 | — | 3.4 | 216 |

Similar tests were also conducted on alloy In 738.

The cyclic test is conducted in a hot corrosion/sulfidation atmosphere in the temperature range of 400° to 1105° C. The total cycle time is 15 minutes long or four cycles per hour. A fifteen minute cycle comprises heating the specimen from 400° to 1105° C, holding at 1105° C (2025° F) for 2 minutes, the temperature then being decreased to 982° C (1800° F) and held there for 10 minutes, and finally decreasing to 400° C and holding at that temperature for the balance of the time to complete the 15 minute cycle.

Figure 1:
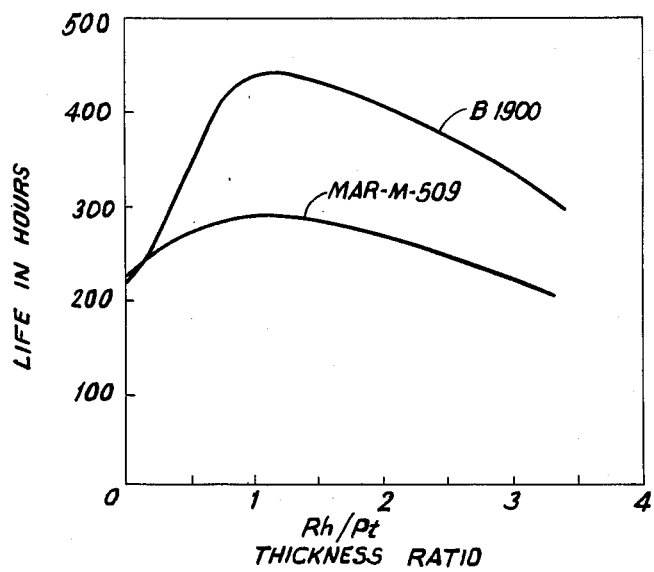
FIG. 1 is a graph illustrating the effect of the Rh/Pt ratio on the high temperature properties of nickel aluminide coatings on two alloy compositions.

As regards alloys B 1900 and Mar-M-509, it will be noted that plating the substrate with the same thickness of rhodium and platinum prior to aluminizing (that is, a thickness ratio of Rh/Pt of 1:1) results in optimum high temperature properties. This will be clearly apparent by referring to FIG. 1 which is a plot of the data showing peak properties at a thickness ratio of Rh/Pt of about 1:1.

As regards IN 738, the optimum life obtained at a thickness Rh/Pt ratio of 1:1 was 343 hours (1372 cycles), the life at a thickness ratio of 1 to 5 being about 322 hours (1288 cycles) and at a ratio of 3 to 1 of about 256 hours (1024 cycles).

The foregoing tests confirm that the ratio of rhodium to platinum on the thickness basis may range from about 0.2:1 to 3.5 and preferably from about 0.5:1 to 2.5:1. As stated hereinbefore, these ratios apply for thicknesses of each of rhodium and platinum ranging from about 0.00005 to 0.002 inch.

By employing the invention as described hereinabove, a composite metallographic structure is obtained which imparts to the alloy substrate markedly improved resistance to hot corrosive gases at elevated temperatures as compared to the use of platinum alone. It is believed that the combination of rhodium and platinum provides synergistic results not obtainable with either one alone.

Figure 2:
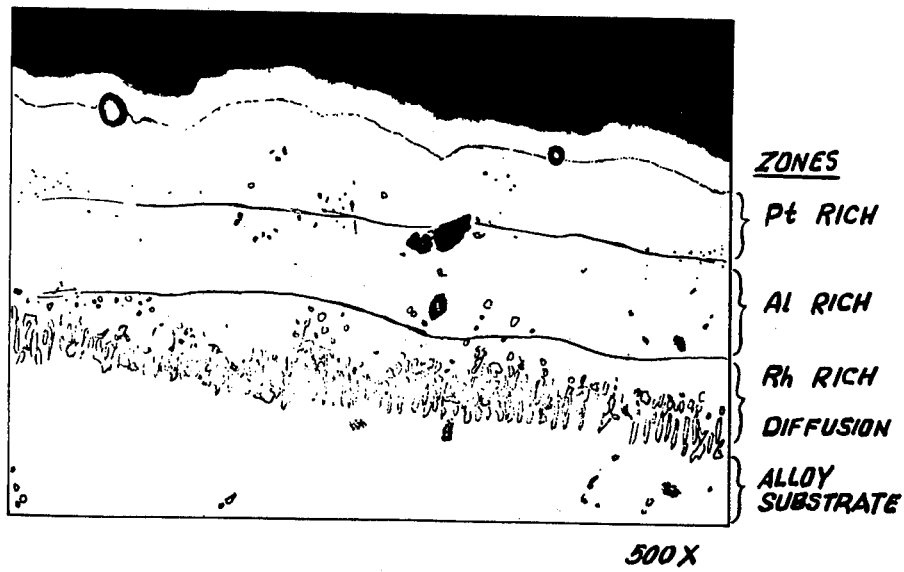
FIG. 2 is representative of a photomicrograph taken at 500 times magnification showing the platinum-rich and rhodium-rich zones obtained on a substrate of an aluminized nickel-base alloy designated in the trade as alloy B1900.

Thus, referring to FIG. 2 which is a representation of a photomicrograph taken at 500 times magnification of alloy B 1900 having a Rh-Pt-Al coating, a rhodium-rich inner zone is shown adjacent the substrate, with a platinum-rich outer zone at the surface, the two zones sandwiching in between an intermediate zone with relatively high nickel aluminide concentration.

Figure 3:
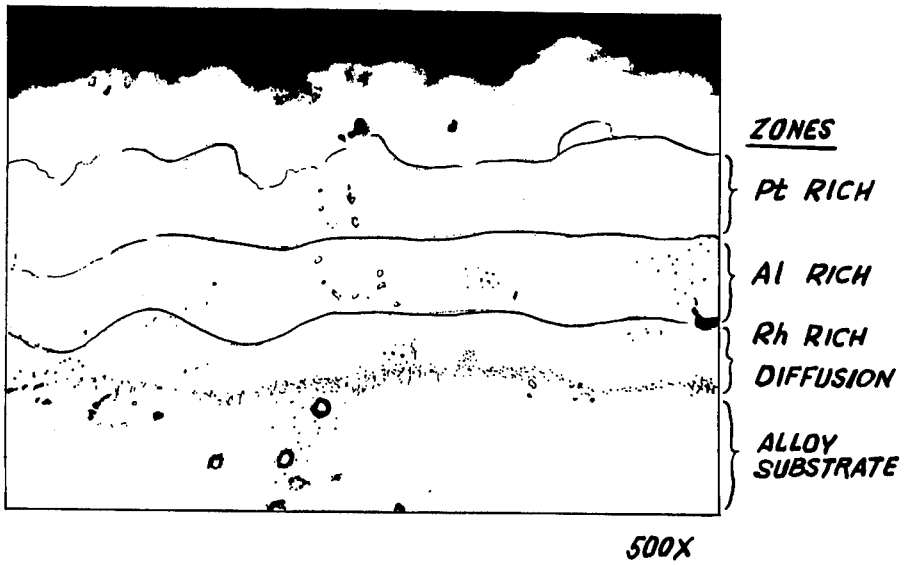
FIG. 3 is representative of a photomicrograph taken at 500 times magnification showing the platinum-rich and rhodium-rich zones obtained on a substrate of an aluminized nickel-base alloy designated in the trade as alloy IN 738.

In FIG. 3 also taken at 500 times magnification, a similar structure is obtained for IN 738 (Rh-Pt-Al).

Figure 4:
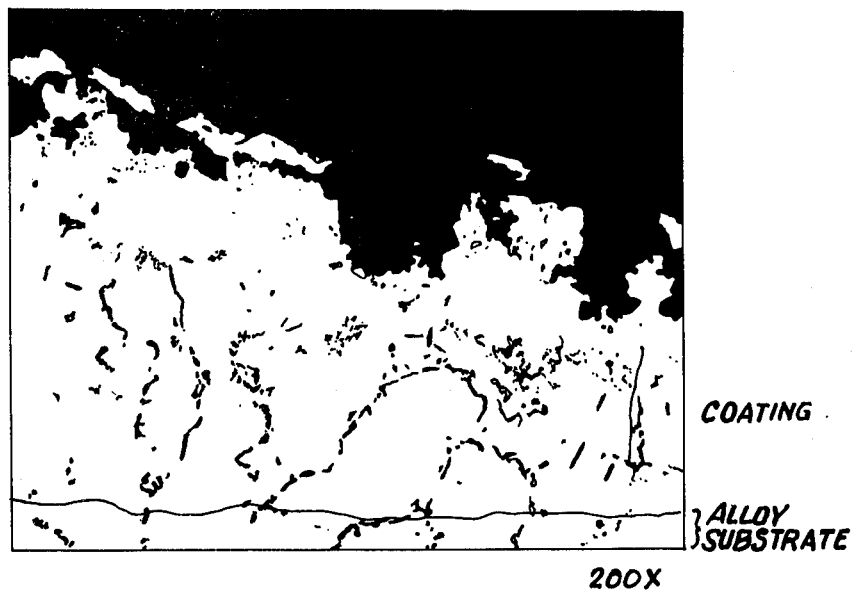
FIG. 4 is a representation of a photomicrograph taken at 200 times magnification of a platinum-containing coating showing that the diffusion zone is no longer visible after 345 hours of cyclic testing over the temperature range of 400° to 1105° C.
Figure 5:
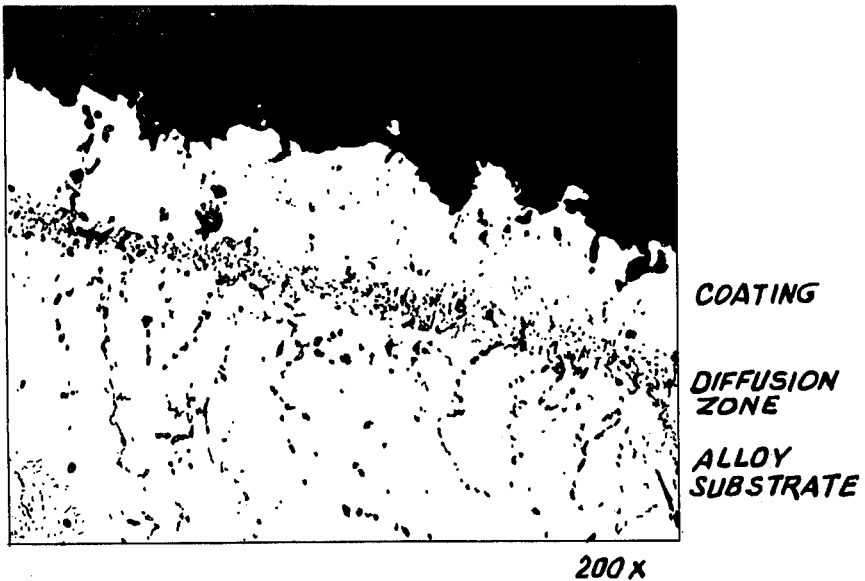
FIG. 5 is representative of a photomicrograph taken at 200 times magnification of a Rh/Pt-containing aluminized coating after 408 hours of cyclic testing over the temperature range of 400° to 1105° C, the micrograph showing the integrity of the coating as evidenced by the fact that the diffusion zone is still maintained after prolonged testing.

FIG. 4 taken at 200 times magnification is a coating based on Pt-Al alone on the alloy substrate of Alloy No. IN 738 after 345 hours of cyclic testing as described hereinabove. It will be noted that the diffusion zone between the coating and the substrate is no longer visible. FIG. 5, also at 200 times magnification, is illustrative of the coating of the invention on alloy IN 738 after 408 hours of cycle testing showing that a distinct diffusion zone is still maintained after a prolonged period at elevated temperature. This composite structure is unique and imparts improved heat resistant properties to the alloy.

As stated hereinabove, the composite structure of the coating is characterized by distinct zones of rhodium adjacent the substrate on the one hand and a platinum zone at or near the surface on the other hand. This is confirmed by electron microprobe traces taken along the cross section of the coating over a span of about 0.004 inch, that is, from zero at the surface of the coating to about 0.004 inch towards the alloy substrate. The electron microprobe trace detects the concentration and distribution of the metals of interest (e.g. Rh and Pt) and is a well known laboratory tool and, therefore, need not be described in detail other than to say that a high energy electron beam is scanned across the coated specimen which is embedded in a metallographic mount. The high energy electrons excite the emission of characteristic X-rays, the X-ray intensity being proportioned to the amount of element emitting the X-rays.

FIGS. 6 to 11 are typical electron microprobe traces obtained on the coating of the invention.

Figure 6:
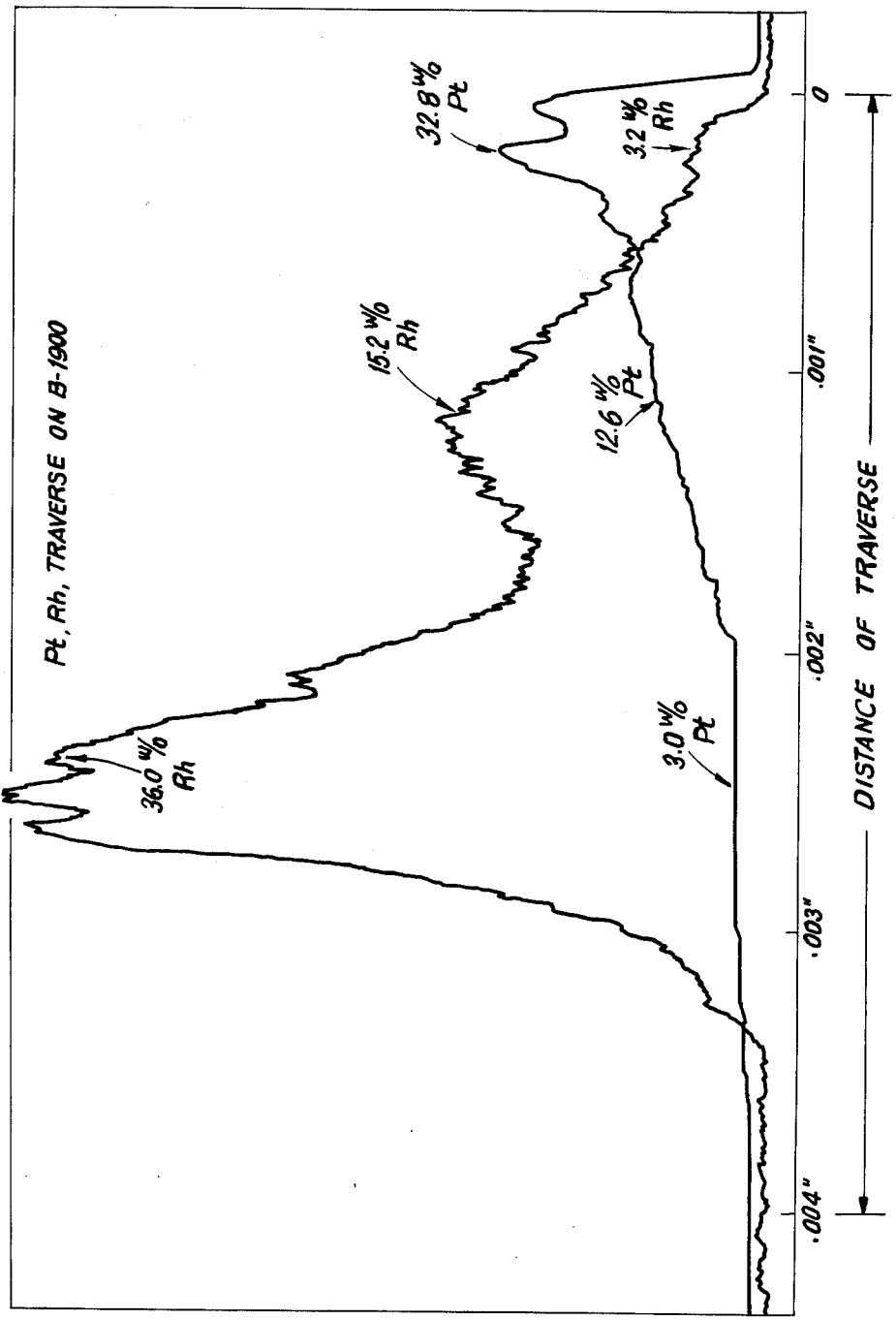
FIG. 6 is an electron microprobe trace of a cross section of an aluminized coating (Alloy B1900) in which the Rh/Pt thickness ratio applied to the alloy substrate prior to aluminizing was about 3:1.

FIG. 6 shows two distinct zones of rhodium and platinum on a coated B 1900 alloy based on pre-plating the metal substrate with 0.0003 inch of rhodium and 0.0001 inch of platinum, followed by a high temperature diffusion heat treatment before applying aluminum by pack cementation. The Rh/Pt ratio in this case is 3:1. As will be noted, the platinum reaches a peak value in the coating near the surface of about 32.8% by weight while the rhodium reaches a peak value near the alloy substrate of about 36% by weight. The aluminum between the two zones was about 30% and comprised nickel aluminide (not shown in the figures).

Figure 7:
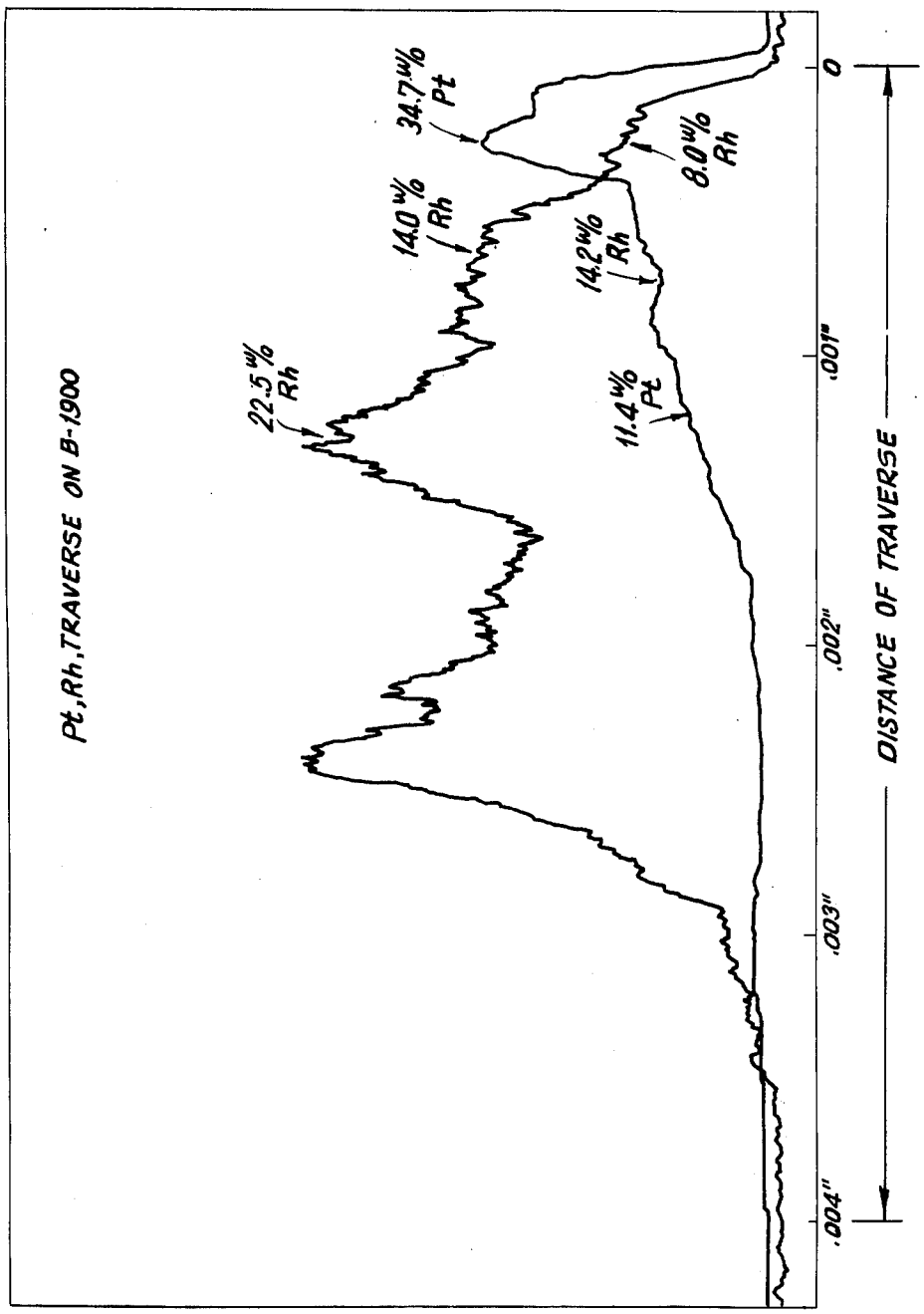
FIG. 7 is an electron microprobe trace of the cross section of an aluminized coating (Alloy B1900) in which the Rh/Pt thickness ratio applied to the alloy substrate prior to aluminizing was about 2:1.

In FIG. 7, the Rh/Pt thickness ratio employed on B 1900 alloy prior to aluminizing was about 2:1. Thus, the platinum zone near the surface showed a peak value of about 34.7% by weight, with the peak value of rhodium towards the substrate reaching about 22.5% by weight. The aluminum between the zones ranged from 30 to 32% by weight as substantially nickel aluminide.

Similar results are indicated for FIG. 8 in which the Rh/Pt thickness ratio on B 1900 alloy prior to aluminizing was 3:2. The platinum-rich zone near the surface showed a peak value of 43.8% by weight, while the rhodium zone near the substrate showed a peak value of 30.5% by weight. The aluminum between the Rh/Pt zone was about 28% by weight substantially as nickel aluminide.

Figure 9:
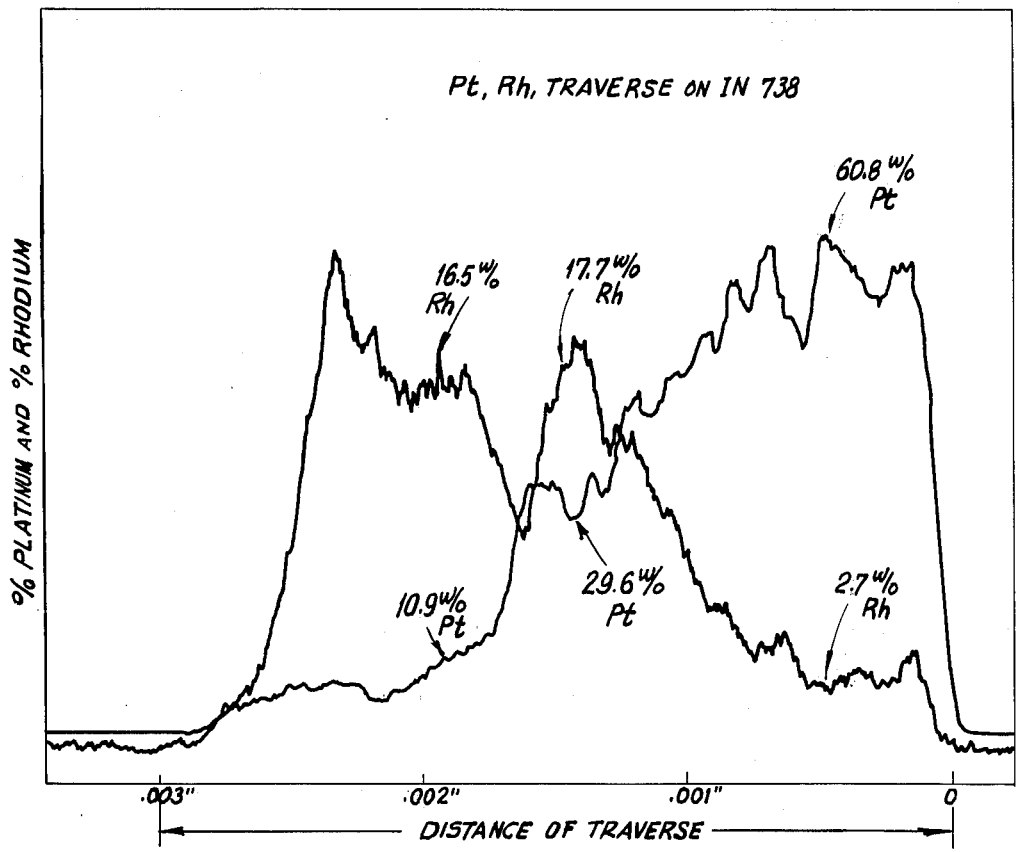
FIG. 9 is an electron microprobe trace of the cross section of an aluminized coating (Alloy IN 738) in which the Rh/Pt thickness ratio applied to the alloy substrate prior to aluminizing was about 1:1.

In the case of FIG. 9 which is an electron microprobe of a coated IN 738 alloy, the ratio of Rh to Pt was 1:1 prior to aluminizing. It will be noted that the platinum-rich zone near the surface contained about 60.8% by weight of platinum, while rhodium showed a peak value of about 17.7% by weight near the substrate. The aluminum between the two zones ranges from about 21% to 28% substantially as nickel aluminide.

Similar results were indicated with coated Mar-M-509 alloy as shown in FIG. 10, the platinum reaching a peak of about 61.3% near the surface and rhodium of about 20.5% by weight towards the substrate. The aluminum content between the two zones ranged from about 20 to 28% by weight substantially as cobalt aluminide.

FIG. 11 is an electron microprobe trace of the B 1900 alloy is which the Rh/Pt thickness ratio prior to aluminizing was 1:3. As will be noted, the platinum near the surface reached a peak value of about 53.5% by weight, the rhodium near the substrate reaching a peak value of about 5.7% by weight. This amount of rhodium is still useful in providing the improvements of the invention. The aluminum between the zones ranged from about 21 to 24% by weight substantially as nickel aluminide.

Thus, for the total aluminized coating thickness (e.g. 0.003 inch), the platinum content in the outer zone constituting approximately one-third of the thickness (near and at the surface) may range from about 10 to 70% by weight, while the rhodium content in the inner zone adjacent the alloy substrate and constituting approximately one-third of the thickness of the coating may range from about 5 to 40% by weight, the outer zone containing platinum aluminide and the inner zone containing rhodium aluminide.

The advantages of using rhodium as the first coating are that it enables nickel to diffuse outward to form the aluminide with the aluminum during pack cementation, while the reverse is true for aluminum; that is to say, aluminum is inhibited from diffusing through the rhodium layer. Thus, this assures a compositely structured coating which enables the coated alloy to be employed for prolonged periods of time without substantially becoming degraded as compared to the prior art coatings. The platinum-rich zone contains platinum aluminide, e.g. $PtAl_2$ and the rhodium-rich zone contains rhodium aluminide, e.g. $RhAl_2$.

As stated hereinbefore, the pack composition for aluminizing the Rh-Pt coated substrates may range by weight broadly from 5 to 40% chromium, $\frac{1}{8}$ to about 20% aluminum, (preferably about $\frac{1}{8}$ to 5%), $\frac{1}{8}$ to 1 or 2% halide energizer (e.g. $\frac{1}{4}$% $NH_4FHF$) and the balance essentially a refractory oxide diluent, e.g. alumina. Within the foregoing ranges, the chromium may be preferably controlled from 7 to 30% and the aluminum from $\frac{1}{8}$ to $2\frac{1}{2}$%. We have found it advantageous in working over the foregoing ranges to employ a chromium to aluminum ratio of about 4:1 to 160:1 and, more advantageously, about 8:1 to 100:1.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for improving the heat and corrosion resistance of a heat resistant article formed of an alloy selected from the group consisting of nickel-base, cobalt-base and nickel-cobalt-base alloys which comprises, providing said articles with a clean surface for receiving a metal coating, thermally diffusing first and second coatings of rhodium and platinum into the surface of said article, said rhodium and platinum having been applied to said article prior to diffusion therein as first and second coatings, respectively, at a Rh/Pt thickness ratio of about 0.5/1 to 2.5/1 at thicknesses of each ranging from about 0.00005 inch to 0.002 inch, and then pack aluminizing said article at an elevated aluminizing temperature by embedding it in a cementation pack containing by weight about 5 to 40% chromium metal and about $\frac{1}{8}$ to 20% aluminum sufficient to effect the diffusion coating thereof into the surface of said article, said pack also containing about $\frac{1}{8}$ to 2% of a vaporizable halogen material as a carrier for said aluminum, thereby producing a multi-layered protective coating characterized metallographically by an outer zone containing platinum and an inner zone substantially adjacent the surface of the article containing rhodium with an intermediate zone enriched in aluminum in the form of at least one intermetallic compound selected from the group consisting of nickel aluminide in the case of nickel-base and nickel-cobalt-base alloys, and cobalt aluminide in the case of nickel-cobalt-base and cobalt-base alloys.

2. The method of claim 1, wherein said rhodium and platinum coatings applied to the article are thermally diffused into the surface of the article prior to aluminizing by heating to an elevated temperature in the range of about 1010° to 1150° C.

3. The method of claim 2, wherein the rhodium first applied to said article surface prior to aluminizing the thermally diffused by heating to said elevated temperature and wherein platinum is applied to said thermally diffused rhodium layer followed by then thermally diffusing said platinum into said article surface prior to aluminizing said article by pack cementation.

4. The method of claim 2, wherein the rhodium and the platinum, respectively, applied to the surface of the article are simultaneously thermally diffused therein at said elevated diffusion temperature.

5. The method of claim 1, wherein said alloy article treated has the following composition containing by weight up to about 30% Cr, up to about 20% of a metal selected from the group consisting of Mo and W, up to about 10% of a metal selected from the group consisting of Cb and Ta, up to about 1% C, up to about 10% by weight of a metal selected from the group consisting of Ti and Al, the total amount of Ti and Al not exceeding about 12%, up to about 20% Fe, up to about 2% Mn, up to about 2Si, up to about 0.2% B, up to about 1% Zr, up to about 2% Hf, and the balance at least 45% by weight of at least one metal selected from the group consisting of nickel and cobalt.

* * * * *